United States Patent [19]

Brazinsky et al.

[11] 4,138,459

[45] Feb. 6, 1979

[54] PROCESS FOR PREPARING A MICROPOROUS POLYMER FILM

[75] Inventors: Irving Brazinsky, Matawan; William M. Cooper, Clinton; Arnold S. Gould, New Providence, all of N.J.

[73] Assignee: Celanese Corporation, New York, N.Y.

[21] Appl. No.: 611,300

[22] Filed: Sep. 8, 1975

[51] Int. Cl.² .................... B29C 17/02; B29D 7/24; B29D 27/00
[52] U.S. Cl. .................... 264/154; 264/288; 264/342 RE; 264/DIG. 47
[58] Field of Search .......... 264/210 R, 230, 235, 264/342 RE, 346, 288, 154, DIG. 47

[56] References Cited

U.S. PATENT DOCUMENTS

| | | | |
|---|---|---|---|
| 2,779,684 | 1/1957 | Alles | 428/910 |
| 3,076,232 | 2/1963 | Dengler | 264/288 |
| 3,426,754 | 2/1969 | Bierenbaum et al. | 264/210 R |
| 3,551,540 | 12/1970 | Pellicciari et al. | 264/342 RE |
| 3,632,726 | 1/1972 | Knox et al. | 264/342 RE |
| 3,632,733 | 1/1972 | Yazawa | 264/346 |
| 3,679,538 | 7/1972 | Druin et al. | 264/DIG. 13 |
| 3,801,692 | 4/1974 | Zimmerman | 264/210 R |
| 3,839,240 | 10/1974 | Zimmerman | 264/210 R |
| 3,843,761 | 10/1974 | Bierenbaum et al. | 264/210 R |
| 4,058,582 | 11/1977 | Bierenbaum et al. | 264/288 |

FOREIGN PATENT DOCUMENTS 922288 3/1963 United Kingdom .................... 264/288

*Primary Examiner*—James B. Lowe
*Attorney, Agent, or Firm*—Marvin Bressler; Linn I. Grim; T. J. Morgan

[57] ABSTRACT

A process for the preparation of an open-celled microporous, polymer film. The improved process comprises the heat relaxing of a microporous polymer film which is formed from a non-porous, crystalline, elastic polymer film which has been uniaxially cold stretched at a temperature in the range of between about −20° C. and a temperature 25° C. below the crystalline melting temperature of the polymer film, followed by hot stretching, in the same direction, the cold-stretched film at a temperature in the range of between about 25° C. below the crystalline melting temperature of the polymer film and 5° C. below the crystalline melting temperature of the polymer film. The heat relaxing step comprises exposing the film under tension to a temperature in the range of between about 40° C. below the crystalline melting temperature of the polymer film and 5° C. below the crystalline melting temperature of the polymer film, such that the maximum dimension in the direction of stretch, of the cold and hot stretched microporous film is reduced.

14 Claims, No Drawings

PROCESS FOR PREPARING A MICROPOROUS POLYMER FILM

BACKGROUND OF THE DISCLOSURE

1. Field of the Invention

The instant invention is directed to a process for the preparation of an open-celled microporous polymer film. More specifically, the instant invention is directed to a process for the preparation of an open-celled microporous film in which a microporous film is prepared and thereafter heat relaxed. Still more specifically, the instant invention is directed to a process for the preparation of a heat relaxed microporous film. Still more specifically, the instant invention is directed to a process for the preparation of an open-celled microporous polymer film in which a microporous film is formed and heat relaxed by exposing the film under tension, to elevated temperatures.

2. Background of the Prior Art

The development of microporous polymer films and processes for producing these films have accelerated in recent years. Some of the more recent developments are disclosed in U.S. Pat. No. 3,679,538 issued on July 25, 1972 to Druin et al. and U.S. Pat. No. 3,843,761 issued on Oct. 22, 1974 to Bierenbaum et al. The former patent discloses a microporous film produced by the steps of cold stretching followed by hot stretching and thereafter heat setting. The latter patent is directed to a process for producing a microporous film in which the film is cold stretched, and then sequentially hot stretched in a plurality of discrete stretching steps. Both of these patents produce a unique microporous film having improved properties over the microporous films of the prior art.

Although films formed in accordance with the above defined patents produce excellent properties, still one of their properties, dimensional stability, is not satisfactory for those applications in which a high degree of dimensional stability is required. In those applications, for instance, where a significant degree of alignment is necessary, long-term dimensional stability is necessary. For example, applications in which the microporous film is initially cut to a specific size and then, sometime later, disposed in a location where the exact dimensions of the cut microporous film must be met, shrinkage of the film prevents that cut film from being used.

Although methods are known in the art for providing films with good dimensional stability, such processes could not, in the prior art, be employed when the substrate was microporous film. In the past the methods that produced a dimensionally stable film adversely affected the gas flux of microporous films. Gas flux of a microporous film is quantitatively defined as the volume of gas that flows through the pores of a fixed surface area of film in a fixed period of time. That is, the methods employed to relax the film, and thus provide a dimensionally stable film, at the same time alter the size and shape of the micropores and hence change its gas flux. Usually, such processes decrease the gas flux of the film. Obviously, the improvement in dimensional stability resulting from the methods of the prior art could thus not be used when the substrate was a microporous film. As those skilled in the art are aware, the gas flux of the microporous film is a critical property of the film.

The above remarks indicate the need for a process that results in the production of a microporous film having significantly improved dimensional stability without adversely affecting the gas flux characteristics of that microporous film.

SUMMARY OF THE INVENTION

The instant invention is directed to an improved process for the preparation of an open-celled microporous film. The process of the instant invention provides an improved microporous film having greater dimensional stability than the microporous films of the prior art made from the same precursor film. At the same time, the process of the instant invention provides a microporous film whose gas flux is substantially the same as the corresponding microporous films produced by the processes of the prior art whose dimensional stability is substantially inferior to the microporous film formed in accordance with this invention.

In accordance with the instant invention an improved process is provided for the preparation of an open-celled microporous film. In this process a non-porous, crystalline, elastic polymer film is uniaxially cold stretched at a temperature in the range of between about $-20°$ C. and a temperature of $25°$ C. below the crystalline melting temperature of the polymer film, followed by hot stretching, in the same direction, the cold stretched film at a temperature in the range of between about $25°$ C. below the crystalline melting temperature of the polymer film and $5°$ C. below the crystalline melting temperature of the polymer film. The improved process comprises heat relaxing the stretched film by exposing the film to a temperature in the range of between about $40°$ C. below the crystalline melting temperature of the polymer film and $5°$ C. below the crystalline melting temperature of the polymer film such that its dimension, in the direction of stretch, is decreased from its maximum cold and hot stretched dimension, in the direction of stretch.

DETAILED DESCRIPTION

The process of the instant invention teaches the preparation of microporous films formed from elastic films of crystalline, film-forming polymers. These elastic films have an elastic recovery at 0 recovery time when subjected to a standard strain of 50 percent at $25°$ C. and 65 percent relative humidity of at least about 40 percent, preferably at least about 50 percent and most preferably at least about 80 percent. The elastic films, employed in the process of this invention to produce a microporous film, also have a percent crystallinity of at least 20 percent, preferably at least about 30 percent, and most preferably at least 50 percent. The properties of elastic films employed in the process of this invention are further defined in somewhat greater detail in U.S. Pat. No. 3,843,761 which is incorporated by reference.

As stated above, the elastic films employed in the process of this invention are made from a polymer of a type capable of developing a significant degree of crystallinity. Among the polymers within this class are polymers selected from the group consisting of polyolefins, polyacetals, polyamides, polyesters, polyalkylene sulfides and polyarylene oxides. Of these polymers, the polyolefinic resins are most preferred. Among the olefinic polymers within the contemplation of this invention are polyethylene, polypropylene, poly-3-methyl butene-1, and poly-4-methyl pentene-1. Also, copolymers which include two or more of the following olefinic polymers: ethylene, propylene, 3-methyl-butene-1 and 4-methyl pentene-1. In addition, the above recited copolymers may also include minor amounts of other olefins. Of course, these polymers are subject to the crystallinity and elastic requirements defined above.

A particularly preferred polymer for employment in the instant invention is polypropylene. When propylene homopolymers are contemplated it is preferred to employ an isotactic polypropylene having a percent crystallinity as indicated above, a weight average molecular weight ranging from about 100,000 to 750,000, a number molecular weight ranging from about 20,000 to 80,000 and a melt flow in units of grams per 10 minutes of (ASTM-1958D-1238-57T, Part 9, page 38) from about 0.1 to about 75, (see ASTM-1958D-1238-57T) to produce a final film product having the requisite physical elasticity and crystallinity properties.

Whatever polymer is employed the preferred method for forming the elastic film is by the blown film extrusion method. This method is described in detail at Column 5, lines 6-43 of the U.S. Pat. No. 3,843,761. Another, second preferred method for forming the starting elastic film of this invention is by the slit die extrusion method. This method is also described in detail in U.S. Pat. No. 3,843,761.

The formed film, which is formed by either the blown film method or the slit die extrusion method is thereafter annealed by the method described in U.S. Pat. No. 3,843,761 at Column 6.

It is emphasized that the above description of the formation of the elastic film is illustrative of the preferred methods of forming a non-porous, crystalline, elastic film which is the precursor film employed in the process of the instant invention. It is emphasized that any non-porous film having the requisite elastic and crystalline properties, may be employed to produce the microporous film of this invention.

The elastic, crystalline, non-porous precursor film is thereafter stretched to produce a microporous film. In the process of this invention, the non-porous elastic film is initially stretched in a cold stretching zone. In a preferred embodiment, the cold stretching step comprises the stretching of the non-porous film between two adjacent rollers the second roller of which rotates at a greater peripheral speed than the adjacent upstream roll. Such a procedure can be accomplished by providing two rolls of the same size in which the second, downstream roller is rotated at a faster rotational speed than the upstream roll. Alternatively, the two rolls can be rotated at the same speed with the downstream roller being of greater diameter than the upstream roller. In both cases, the downstream roller imparts a greater linear velocity to the film than does the adjacent upstream roller. Such a procedure results in the uniaxial stretching of the film, that is, the film is stretched in the direction of stretching. In a preferred embodiment, the film is stretched in the longitudinal direction during the cold stretching step. By "cold stretching" is meant stretching the film at a temperature in the range of between about $-20°$ C. and a temperature 25° C. below the crystalline melting temperature of the polymer which the film is formed of.

The cold-stretched film is thereafter hot-stretched in the same direction as the direction of stretching employed in the cold-stretched step to produce a microporous film. Thus, the film retains its uniaxial stretching configuration. The hot stretching step may comprise a single step, as disclosed in U.S. Pat. No. 3,679,538, or alternatively, the film may be stretched in a plurality of discrete stretching steps as taught in U.S. Pat. No. 3,843,761. In either case, the hot stretching step is so defined to indicate the temperature at which the film is stretched. In accordance with this invention, the hot stretching step occurs at a temperature in the range of between about 25° C. below the crystalline melting temperature of the polymer film and 5° C. below the crystalline melting temperature of the polymer film.

The total degree of stretching that occurs in both the cold and hot stretching steps ranges from about 10 percent to 300 percent, based on the initial length of the elastic precursor film. More preferably, the total amount of stretching is in the range of between about 50 percent to 150 percent, based on the length of the elastic precursor film. Of this total amount of stretching, the degree of hot stretching to the total amount of stretching which occurs in both the cold and hot stretching steps, is in the range of from about 0.10:1 to below about 0.99:1. More preferably, this ratio of percent hot stretch to percent total stretch is in the range of between about 0.50:1 and 0.97:1. Still more preferably, this ratio is in the range of between about 0.60:1 and 0.95:1. It is to be noted that this ratio, percent hot stretch to percent total stretch, is often referred to as the "extension ratio".

In the preferred embodiment wherein the elastic precursor film is polypropylene film, the temperature at which the elastic polypropylene film is uniaxially cold stretched is at a temperature in the range of between about 0° C. and 120° C. The hot stretching step that follows the cold stretching step occurs at a temperature in the range of between about 120° C. and 150° C. It is to be noted that these temperature ranges are within the limitations indicated above in general for any polymeric film processed in accordance with this invention.

The degree of stretching, in the case where the polymer is polypropylene, also follows the general definition given above for the degree of stretching for any polymer. However, it is preferred that the cold stretching step provide an extension in dimension in the direction of stretch, in the range of between 6 percent and 30 percent, based on the unstretched length of the precursor film. Similarly, in the case where the polymer is polypropylene hot stretching results in an extension, in the direction of stretch, of between about 80 percent and 140 percent, based on the length of the cold stretched film.

Following the hot stretching step, the improved process of the instant invention includes the step of heat relaxing the cold and hot stretched microporous film under tension, at a temperature in the range of between about 40° C. below the crystalline melting temperature of the polymer film and 5° C. below the crystalline melting temperature of the film to produce microporous film having a reduced dimension in the direction of stretch. More preferably the temperature at which the microporous film is heat relaxed is in the range of between about 25° C. below the crystalline melting temperature of the polymer film and 10° C. below the crystalline melting temperature of the polymer film. In a preferred embodiment, the microporous film is heat relaxed under tension such that the dimension of the microporous film, in the direction of strength is reduced by between about 10 percent and 25 percent, based on the original dimension in the direction of stretch of the hot-stretched microporous film. In still a more preferred embodiment, the degree to which the microporous film is decreased in dimension, in the direction of stretch, is between about 15 and 20 percent, based on the dimension in the direction of stretch of the hot-stretched microporous film preferably, the direction of stretch is the longitudinal direction.

In the preferred embodiment wherein the polymer is polypropylene the microporous film is heat relaxed at a temperature in the range of between about 120° C., and 155° C. More preferably, the temperature of heat relaxation is in the range of between about 135° C. and 150° C. Still more preferably, the temperature at which the polypropylene microporous film is heat relaxed is at a temperature in the range of between about 138° C. and 145° C.

In a preferred embodiment, the heat relaxation step, as well as the hot stretching step, occurs in an oven maintained at a temperature equivalent to the temperature recited for hot stretching and heat relaxation. It is to be noted that because the film is thin, the temperature of the film reaches equilibrium with the oven temperature quite rapidly, and for all intents and purposes the film temperature and the oven temperature are approximately the same.

In a preferred embodiment, the heat relaxation step is accomplished by passing the microporous film, which has been cold and hot stretched, under tension over at least 2 rollers such that the maximum hot stretched dimension, in the direction of stretch, is decreased. In one preferred embodiment in which the dimension in the direction of stretch is reduced, heat relaxation is accomplished by rotating the downstream roller at a peripheral speed less the adjacent upstream roller. Although, a minimum of one heat relaxing step is required, there may be a plurality of these steps.

In this regard, it should be emphasized that the hot stretching step, in a preferred embodiment, is accomplished by stretching the film in an oven maintained at a temperature equal to the temperature of hot stretching, over at least one pair of rollers, the downstream roller of which imparts a greater linear velocity to the film than imparted by the adjacent upstream roller. As in the case of the heat relaxing step, more than one hot stretching step may be employed. As stated above, this invention should not be limited by the number of steps employed to produce the hot stretched microporous film. As in the case of the cold stretching step, imparting of greater speed to the film by the downstream roller can be accomplished by either employing two rollers, rotated at different speeds, in which the downstream roller is rotated at a greater speed than the upstream roller, or alternatively, by rotating the two rollers at the same speed but where the downstream roller has a greater diameter than the adjacent upstream roller. It should be appreciated that in the preferred embodiment wherein the microporous film is heat relaxed by disposing the film under tension over at least two rollers, the downstream roller of which rotates at a peripheral speed less than the peripheral speed imparted by the adjacent upstream roller than two same methods may be employed to produce this result. This is, the upstream and downstream adjacent rollers can be of the same diameter with the upstream roller rotated at a greater rotational velocity or the upstream and downstream roller may be rotated at the same velocity with the upstream roller being of greater diameter than the downstream roller to thus provide a greater peripheral speed.

The heat relaxing step may, in one preferred embodiment, immediately follow the rollers that impart hot stretching to the film. In this way, a continuous process is provided. This is not to say that the alternative method of operation wherein a microporous film which has been cold and hot stretched cannot be separately processed in accordance with the heat relaxing process of this invention. Thus, in a preferred embodiment, a roll of microporous film formed by the cold and hot stretching, described above, may be passed, under tension, over at least two rollers to heat relax the film at a temperature within the temperature range specified for this process.

The following examples are presented to illustrate the instant invention. In view of the fact that these examples are given for illustrative purposes only, they should not, in any way be construed as limiting the invention thereto.

EXAMPLE I

An elastic, crystalline non-porous polypropylene film having an elasticity and crystallinity within the requirements defined above was employed as the precursor film. The elastic film was produced from a polypropylene homopolymer having a melt flow of 0.5, that is, 0.5 grams/10 minutes as defined in ASTM-1958D-1238-57T, Part 9, page 38. The polypropylene homopolymer had a number average molecular weight of 50,000 and a weight average molecular weight of 580,000. The precursor film was cold stretched at room temperature, approximately 25° C., to produce a 20 percent cold stretch, based on the length of the precursor film. That is, the length of the cold stretch film was 20 percent in excess of the length of the unstretched precursor film. The cold stretched film was thereafter hot stretched to produce a microporous film. Hot stretching comprised stretching the film in 19 discrete steps, in an oven maintained at 142° C. to increase its length 85 percent, based on the length of the cold stretched film. The cold and hot stretching steps thus resulted in a microporous film having a length 123% in excess of the length of the unstretched film. The discrete steps were provided by a plurality of rolls which were all rotated at the same speed. Each consecutive downstream roll had a larger diameter than the previous roll to provide greater peripheral velocity and thus result in stretching between adjacent rolls.

The heat relaxing step occurred immediately subsequent to the last hot stretching step. In this case, two additional rolls, connected to the same power source as the 19 upstream rolls were disposed downstream of the largest roll employed in hot stretching the film. Each of these two rolls had a smaller diameter than the preceding adjacent upstream roll. In this way, the film was slowed down over the rolls under tension resulting in a 17 percent decrease in length, based on the length of the hot stretched microporous film. This resulted in a heat relaxed microporous film having a length 85 percent in excess of the unstretched precursor film. The heat relaxing step, performed in the same oven as the hot stretching step, occurred, of course, at a temperature of 142° C.

For comparison, the same run was made using the same precursor film as employed to produce a stabilized microporous film. In this case, the film was wound up after exiting the 19th roll. Thus, although the microporous film was processed under exactly the same conditions as applied in the stabilized run, no heat relaxation step was provided. Film samples were taken from the films made in accordance with each of these two process runs. For greater accuracy the physical properties obtained from the testing of 8 separate runs were averaged to produce the data appearing hereinbelow. Table 1 below reports data indicative of the two very important properties of microporous films, gas flux and dimensional stability. These results appear in Table 1.

TABLE 1

|  | Stabilized Film | Unstabilized Film |
|---|---|---|
| Gas Flux, Gurley seconds | 39.0 | 39.3 |
| Dimensional Stability Accelerated Shrinkage, % | 1.4 | 9.4 |

The above data indicates that the gas flux for the stabilized and unstabilized film is substantially the same. Thus, there has been no change in this property. It should be noted that the gas flux test was accomplished by the employment of a standard test, ASTM D-726-65(B3). This test measured in Gurley seconds reports the time it takes for a fixed volume of air, under a fixed pressure, to flow over a fixed cross-section area of test specimen. Obviously, the lesser the time required in seconds (Gurley seconds) required, the more porous is the film. It should be also noted that the data represented inner ply films. In this test 8 plies of precursor film were processed simultaneously. It is well established that the outer plies of multi-ply webs processed in accordance with the procedure enumerated above do not produce the same quality product as the inner plies whether the film is heat stabilized or not. Indeed, inner plies are employed to meet rigid specification limitations for microporous films.

The dimensional stability data, reported as accelerated shrinkage in percent, represents the decrease in length of, the dimension in the direction of stretching, after exposing the film to 90° C. for 1 hour. The percent is reported as the percent based on the original length of the film prior to its exposure to 90° C. for 1 hour.

As indicated in Table 1 the dimensional stability of the heat stabilized film made in accordance with the process of this invention is significantly improved over the unstabilized film produced in accordance with the processes of the prior art.

EXAMPLE II

Another example was made using the exact same procedure as enumerated in Example I except for the use of a different type of polypropylene homopolymer. In this example the polypropylene homopolymer had a melt flow of 5. (Melt flow is measured in grams per 10 minutes but conventionally is reported without dimension). The number average molecular weight of the polypropylene employed to produce the precursor film was 26,000 and its weight average molecular weight was 360,000. The film was processed using the same equipment as employed in Example I. However, in this example the elastic, precursor film was cold stretched 8 percent, based on the length of the precursor film at ambient temperature. The cold stretched film was thereafter hot stretched to produce a microporous film. Hot stretching comprised stretching the cold stretched film by 120 percent, based on the length of the cold stretched film at a temperature of 139° C. (oven temperature). Thus, the unrelaxed microporous film had a length 138 percent in excess of the length of the unstretched precursor film. Heat stabilization again resulted in a decrease in length of 17 percent based on the length of the hot stretched microporous film. The heat stabilized microporous film therefore had a final length 98 percent in excess of the length of the unstretched precursor film. Heat stabilization, like hot stretching, occurred at the oven temperature, 139° C. Again, the film was processed with 8 plies and the data reported herein all represent data taken from inner plies. The stabilized data reported in Table 2 below represents the average results of four separate tests made from four different runs all processed in accordance with the conditions enumerated above. Table 2 appears below.

TABLE 2

|  | Stabilized Film | Unstabilized Film |
|---|---|---|
| Gas flux, Gurley seconds | 9.8 | 9.2 |
| Dimensional Stability Accelerated Shrinkage, % | 1.7 | 10.2 |

It is noted that the results obtained in Example I which were directed to an average flux variant, were repeated in this Example which is directed to a high flux variant product. The flux, a manifestation of porosity, is approximately the same in both the stabilized and unstabilized cases. However, dimensional stability, as manifested by accelerated shrinkage, greatly decreased when the film was processed in accordance with the process of the instant invention.

EXAMPLE III

Two runs were made to determine if the unexpected results noticed above were due to the heat relaxing step or merely were caused by decreasing the degree of stretching. That is, in both Examples I and II the film was stretched over 100 percent of its unstretched length during cold and hot stretching followed by a decrease in length of 17 percent during the heat relaxation step. To determine whether the significantly improved results could be obtained without heat relaxation, two runs were made in which the total degree of stretch were varied by a significant degree. In both cases no heat relaxation step was included. Both runs employed the same polypropylene homopolymer as employed in Example I. This average flux variant, as indicated in Example I, has a melt flow of 0.5, a number average molecular weight of 50,000 and a weight average molecular weight of 580,000. Both runs were made at a cold stretch temperature at room temperature, approximately 25° C. and at a hot stretch temperature of 142° C.

The first run included a cold stretching step that resulted in a 28 percent elongation. This was followed by hot stretching, resulting in a 58 percent elongation, based on the length of cold stretching film to produce a total stretch of 102 percent. The resultant data, again taken from inner plies, indicated a gas flux of 30 Gurley seconds and an accelerated shrinkage of 10 percent.

The second run, run under the exact same temperature conditions as applied in the first run, and employing the same precursor film resulted in a cold stretch of 30 percent and a hot stretch of 80 percent, based on the unstretched and cold stretched lengths respectively. The result of this microporous film which had a total stretch of 134 percent was a gas flux of 32 Gurley seconds and an accelerated shrinkage of 12 percent in length. These results are remarkably similar to the result attained in the first sample.

The results of these unstabilized runs which produced microporous film possessing a total degree of stretch which differed by 32 percent, based on the original unstretched length of the precursor film, lead to the conclusion that the cause of the improved results noticed in Examples I and II is not due to the degree of stretch, but rather to the heat relaxing step, unique to the process of the instant invention.

EXAMPLE IV

Another experiment was run in which only a single hot stretching step was employed and where the microporous film was separately processed for heat relaxation. That is, the heat relaxation step occurred non-continuously with the hot stretching procedure. In addition, in this example variation in the degree of heat relaxation was considered. That is, the percent relaxation varied from 0 percent to 15 percent. These points will be made clear below in the description of the test. In this test a polypropylene homopolymer was prepared by cold stretching an elastic, crystalline non-porous precursor film to the extent of 10 percent, that is, the film was extended 10 percent in length based on the length of the precursor film. The cold stretched film was thereafter hot stretched, in an oven maintained at 135° C. The hot stretching step was accomplished over a pair of rollers, the second roller of which was rotated at a greater peripheral speed than the adjacent upstream roller. In this case, the rollers were approximately of the same diameter and were separately rotated such that the downstream roller rotated more rapidly than the upstream roller. The degree of stretching imparted during the hot stretch step was 90 percent, based on the length of the unstretched precursor film. Therefore, the process to produce an unstabilized microporous film represented a stretching of 100 percent, based on the length of the unstretched precursor film.

A sample of this film was tested in accordance with the testing procedures to be discussed below. In addition, other samples of microporous film prepared in accordance with this procedure were relaxed in accordance with the process of the instant invention. The heat relaxation step again comprised passing the microporous film over a pair of rollers under tension in this test at a temperature of 155° C. This test differed from the previous tests described in Examples I and II in that the degree of relaxation, that is, the percent decrease in length, was varied. It should be emphasized that all the film samples, that were heat relaxed as described below, were characterized by a decreased length, compared to the maximum length of the hot stretched microporous film, prior to the heat relaxation step.

The first of these tests employed a pair of rollers rotating at the same peripheral speed so that the percent relaxation was 0 percent. In the remainder of the tests the upstream roller rotated at a peripheral speed in excess of the peripheral speed of the downstream roller. In each of these cases, this greater peripheral speed was imparted by separate control of the rollers which were all approximately of the same diameter. Tests were made with a percent relaxation of 3.5 percent, 7.5 percent, 10 percent and 15 percent, in addition to the 0 percent test discussed above. Percent relaxation, in all cases, was defined as the decrease in length based on the length of the microporous film just prior to its passing over the upstream roller during heat relaxation. In all of the below heat relaxed runs the residence time over the rollers was 10 minutes. The results of this test are enumerated below in Table 3.

TABLE 3

| Film | Heat Relaxation Temp. ° C. | % Heat Relaxation | % Dimensional Stability |
|---|---|---|---|
| Non-Heat Relaxed | — | — | 69 |
| Heat Relaxed | 155 | 0 | 92 |
| Heat Relaxed | 155 | 3.75 | 95 |

TABLE 3-continued

| Film | Heat Relaxation Temp. ° C. | % Heat Relaxation | % Dimensional Stability |
|---|---|---|---|
| Heat Relaxed | 155 | 7.5 | 95 |
| Heat Relaxed | 155 | 10.0 | 97 |
| Heat Relaxed | 155 | 15.0 | 97 |

It is noted that no data is supplied for gas flux. This was because it was found that all the samples tested resulted in approximately the same gas flux, for heat relaxed and non-heat relaxed film. Thus, the effect of heat relaxation was not noticed on the gas flux of the film. However, as indicated in Table 3 the dimensional stability markedly improved even when there was 0 percent relaxation. As indicated above this is to be expected in view of the fact that the microporous film had previously decreased in length from its maximum hot stretch length. That the film was relaxed under tension was enough to significantly improve dimensional stability.

It is also to be noted that dimensional stability, in this example, was determined by the measurement of a microporous film before and after exposure of the film to one hour at 125° C. The recorded number represents the percent of the original length retained in the longitudinal direction after exposure to these conditions.

It is to be noted that this test also included data relating to percent flux loss which is not reported in Table 3. This is due to the scatter of the data leading one to question its reliability. In general, the non-heat relaxed film resulted in a flux loss of approximately 72 percent. The heat relaxed film, in the range of percent relaxation examined resulted in a flux loss of from about 8 to 23 percent a considerable improvement. It is noted that flux loss was measured by determined gas flux before and after exposure to 125° C. for 1 hour.

EXAMPLE V

A series of runs were made to determine the importance of maintaining the microporous film under tension during heat relaxation.

In the first of these tests microporous polypropylene films which were cold and hot stretched in a manner analagous to the procedure enumerated above were heat relaxed under free to shrink conditions, that is, not under tension, by hanging samples of the film in an oven. The heat relaxation temperature ranged from 100° C. to 120° C. In this case the residence time, the time the film was exposed to the oven temperature of from 100° C. to 120° C., was varied from 5 to 60 minutes. Immediately after the heat relaxing step, the gas flux was measured in terms of Gurley seconds and compared to the Gurley value of the untreated film. At this time, also, the length the dimension in the direction of stretch was also measured and compared to the unrelaxed length to determine the percent heat relaxation. To determine dimensional stability, the heat relaxed film was exposed to a temperature of 70° C., in an oven, for 7 days. At this time the film was taken out of the oven and its length again measured. The dimensional stability, measured as shrinkage, was reported. The results of this test is summarized below in Table 4.

TABLE 4

Free to Shrink Relaxation Conditions

| Temp. °C. | Time min. | Heat Shrinkage | Gurley Second Increase % | Stability 7 days at 70° C. Shrinkage % |
|---|---|---|---|---|
| 100 | 5 | 7.0 | 19 | 2.3 |
| 100 | 10 | 6.3 | 16 | 1.9 |
| 100 | 60 | 10.9 | 44 | 0.7 |
| 110 | 5 | 10.9 | 37 | 0.9 |
| 110 | 10 | 12.3 | 49 | 0.7 |
| 110 | 60 | 15.3 | 78 | 0.2 |
| 120 | 5 | 16.2 | 93 | 0.5 |
| 120 | 10 | 17.6 | 115 | 0.1 |

The above results indicate that although heat relaxation under free to shrink conditions results in greatly improved dimensional stability, the problem noticed in the prior art, relating to heat relaxed microporous films is retained. That is, the gas flux of heat relaxed film, is greatly reduced. (It is to be remembered that the greater the gas flux the low Gurley seconds value obtained). This data indicates the criticality of heat relaxing under tension to obtain the unexpectedly improved results indicated previously.

The above preferred embodiments and examples are given to illustrate the scope and spirit of the instant invention. Other preferred embodiments and examples within the scope and spirit of the present invention are also within the contemplation of this invention.

What is claimed is:

1. In a process for the preparation of an improved open-celled microporous polymer film in which a non-porous, crystalline, elastic precursor polymer film, said precursor film having an elastic recovery at 0 recovery time when subjected to a standard strain of 50% at 25° C. and 65% relative humidity of at least 40% and a percent crystallinity of at least 20%, is uniaxially cold-stretched at a temperature in the range of between about −20° C. and a temperature 25° C. below the crystalline melting temperature of the polymer film followed by hot-stretching, in the same direction, said cold-stretched film at a temperature in the range of between about 25° C. below the crystalline melting temperature of the polymer film and 5° C. below the crystalline melting temperature of the polymer film to produce a microporous film, the improvement which comprises heat relaxing said hot-stretched film by exposing the film under tension to a temperature in the range of between about 40° C. below the crystalline melting temperature of the polymer film and 5° C. below the crystalline melting temperature of the film such that the maximum dimension, in the direction of stretch, of the hot-stretched microporous film is decreased by between about 15 and 20%, based on the length of said hot-stretched microporous film prior to relaxation.

2. An improved process in accordance with claim 1 wherein said heat relaxation temperature is in the range of between about 25° C. below the crystalline melting temperature of the polymer film and 10° C. below the crystalline melting temperature of the polymer film.

3. An improved process in accordance with claim 1 wherein said heat relaxation step comprises moving said cold and hot stretched microporous film under tension over at least one pair of rollers.

4. An improved process in accordance with claim 3 wherein said upstream roller rotates at a peripheral speed in excess of the peripheral speed of the adjacent downstream roller.

5. An improved process in accordance with claim 3 wherein said heat relaxation step occurs immediately following said hot stretching step.

6. An improved process in accordance with claim 1 wherein said non-porous, crystalline elastic polymer film is selected from the group consisting of polyolefins, polyacetals, polyamides, polyesters, polyalkylene sulfides and polyarylene oxides.

7. An improved process in accordance with claim 1 wherein the maximum dimension, in the direction of stretch, of the hot-stretched microporous film is decreased by about 17 percent based on the length of said hot stretched microporous film prior to relaxation.

8. In a process for the preparation of an open-celled microporous polypropylene film in which a non-porous, crystalline, elastic polypropylene film, said polypropylene film having an elastic recovery at 0 recovery time when subjected to a standard strain of 50% at 25° C. and 65% relative humidity of at least 40% and a percent crystallinity of at least 20%, is uniaxially cold-stretched at a temperature in the range of between about 0° C. and 120° C. followed by hot-stretching, in the same direction, of said cold-stretched film at a temperature in the range of between about 120° C. and 150° C., the improvement which comprises heat relaxing said hot-stretched film under tension by exposing said film to a temperature in the range of between about 120° C. and 155° C. such that the maximum dimension, in the direction of stretch, of the hot-stretched microporous polypropylene film is decreased by between about 15 and 20%, based on the length of said hot-stretched microporous polypropylene film prior to relaxation.

9. An improved process in accordance with claim 8 wherein said heat relaxation temperature is in the range of between about 138° C. and 150° C.

10. An improved process in accordance with claim 9 wherein said heat relaxation temperature is in the range of between about 138° C. and 145° C.

11. An improved process in accordance with claim 8 wherein said heat relaxation step comprises passing said cold and hot stretched film over at least one pair of rollers in an environment maintained at the heat relaxation temperature.

12. An improved process in accordance with claim 11 wherein said upstream roller is rotated at a peripheral speed in excess of the peripheral speed of the adjacent downstream roller.

13. An improved process in accordance with claim 8 wherein said heat relaxation step occurs immediately following said hot stretching step.

14. An improved process in accordance with claim 8 wherein the dimension of stretching is the longitudinal direction.

* * * * *